United States Patent
Gonikberg

(10) Patent No.: US 6,914,933 B1
(45) Date of Patent: Jul. 5, 2005

(54) METHOD AND APPARATUS TO IDENTIFY A REMOTE COMMUNICATION APPARATUS AND ENHANCE COMMUNICATION PERFORMANCE BASED ON THE IDENTIFICATION

(75) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 746 days.

(21) Appl. No.: 09/658,754

(22) Filed: Sep. 8, 2000

(51) Int. Cl.[7] .............................................. H04B 1/38
(52) U.S. Cl. ...................................... 375/222; 375/377
(58) Field of Search ................................ 375/222, 219, 375/224, 377; 379/93.32, 93.34

(56) References Cited

U.S. PATENT DOCUMENTS

| | | | | |
|---|---|---|---|---|
| 4,215,243 A | * | 7/1980 | Maxwell | 379/93.34 |
| 4,680,773 A | * | 7/1987 | Amundson | 375/222 |
| 4,849,989 A | * | 7/1989 | Kamerman | 375/231 |
| 5,311,578 A | * | 5/1994 | Bremer et al. | 379/93.32 |
| 6,701,379 B1 | * | 3/2004 | Urquizo et al. | 709/250 |

OTHER PUBLICATIONS

International Telecommunication Union, ITU-T (V.90), Sep. 1998, pp. 1–50.
International Telecommunication Union, ITU-T (G.992.2), Jun. 1999, pp. 1–170.

* cited by examiner

*Primary Examiner*—Khai Tran
*Assistant Examiner*—David B. Lugo
(74) *Attorney, Agent, or Firm*—Christie, Parker and Hale, LLP

(57) ABSTRACT

A type or brand of remote communication device is identified by measuring one or more characteristics associated with one or more signals sent by the remote communication device. The measured characteristics differ among different devices and/or manufacturers and are compared to known characteristics of one or more signals associated with known communication devices. Once the remote communication device is identified, the local communication device can enable one or more performance enhancing or deficiency compensation features based on the identity of the remote communication device.

33 Claims, 2 Drawing Sheets

METHOD AND APPARATUS TO IDENTIFY A REMOTE COMMUNICATION APPARATUS AND ENHANCE COMMUNICATION PERFORMANCE BASED ON THE IDENTIFICATION

BACKGROUND OF THE INVENTION

1. Field of the Invention

The present invention relates to data communication systems and, more particularly to identifying remote communication equipment and enhancing communication performance in data communications systems.

2. Description of the Related Art

Many communication standards have been adopted to ensure interoperability of communications systems built by different manufacturers that operate under the same protocol. Such standards define the sequence and type of signals that a particular communications system needs to follow in order to work properly with other communications systems implemented in accordance with the same standard.

In practice however different manufacturers build communications systems that deviate from the standards. Sometimes those deviations are intentional, e.g., to accommodate hardware limitations or to simplify software. Other times those deviations are unintentional and arise from hardware of software "bugs". Once communication devices that differ from the standard are deployed in significant numbers it becomes important for other manufacturers of communications systems subsequently deployed to ensure interoperability with the already deployed deviating devices.

New communications equipment may compensate for deviations from the standard by already deployed devices when implementing a standard communication protocol. Unfortunately compensation for such deviations may also constitute a deviation from the standard and can break interoperability with other equipment implementing the same protocol. Furthermore, compensation for such deviation may require disabling one or more performance enhancing features of the protocol.

The International Telecommunication Union—Telecommunications Standardization Bureau ("ITU-T") in Geneva, Switzerland, develops and publishes "Recommendations" that relate to communications protocols. The ITU-T Recommendations are non-binding international standards whose objective is to insure interoperability of communication equipment built by different vendors. For example, Recommendation V.90, which is incorporated herein by reference, is entitled A Digital Modem and Analogue Modem Pair for Use on the Public Switched Telephone Network (PSTN) at Data Signalling Rates of Up to 56 000 bit/s Downstream and Up to 33 600 bit/s Upstream, and describes one such protocol.

As part of the V.90 Recommendation the spectral characteristics of a signal emitted by a digital modem can be altered by a technique called "spectral shaping" which is described in paragraph 5.4.5 of the Recommendation. That technique allocates some of the data carrying capacity of the channel for the purpose of altering the spectrum of the signal to improve signal demodulation by the analog modem. The parameters of the "spectral shaping" are determined by the analog modem. One of those parameters is the number of bits used for spectral shaping per mapping frame (a group of six symbols). Spectral shaping improves as more bits are used but that reduces the data carrying capacity of the symbols. The analog modem determines the number of bits used by spectral shaping to optimise the throughput. In order to increase throughput, when the communication channel permits, the analog modem disables spectral shaping.

As an example of a failure of interoperability, it was determined during field testing that certain digital modems have a problem when spectral shaping is disabled. When an analog modem requests that spectral shaping be disabled, the particular digital modems function improperly and stop responding to any further communication. To insure interoperability with digital modems that deviate from the standard in that manner, an analog modem has to request spectral shaping even when line conditions do not require it. Since spectral shaping reduces data carrying capacity, the throughput is subsequently reduced. The V.90 Recommendation does not provide for the identification of the type or brand of the remote modem and thus spectral shaping has to always be enabled to ensure interoperability.

Accordingly, it would be desirable to be able to identify remote communication equipment in order to adjust communication performance according to device capability. More generally, it would be desirable to identify a remote communication device when the communication protocol under which it operates fail to provide a standard or convenient method to identify the remote device. It would be further desirable, based on that identification, to improve communication performance, compensate for deviations from communication standards or otherwise improve system capabilities.

SUMMARY OF THE INVENTION

Accordingly, in accordance with one aspect of the present invention, a method is provided to identify a remote communication device by type, brand or model. The method includes evaluating one or more characteristics associated with one or more signals sent by the remote communication device and comparing the evaluated one or more characteristics to characteristics of signals sent by known devices to determine the identity of the remote communication device. Once the identification is made, the local communication device enables one or more performance enhancing or deficiency compensation features based on the identity of the remote communication device. In an embodiment, the evaluating occurs during a training phase in establishing communication with the remote communication device.

In an embodiment, the remote communication device is a digital modem and the local communication device is an analog modem.

In an embodiment, the local communication device measures the duration of one or more modem training signals, which are compared to stored duration values of signals sent by known communication devices, to identify the remote communication device.

In accordance with another embodiment of the present invention, a method is provided that includes evaluating one or more characteristics associated with one or more signals sent by a remote communication device and comparing the evaluated one or more characteristics to characteristics of signals sent by known devices. Based on the comparison, the local communication device enables one or more performance enhancing or deficiency compensation features.

In another embodiment the invention provides an apparatus that includes a local device operable to measure one or more parameters associated with one or more signals sent during a communication session with a remote communications device. The apparatus also includes storage elements containing one or more parameters associated with one or more known communication devices. The local device is operable to compare the measured one or more parameters of the one or more signals to the stored one or more parameters.

In an embodiment of the apparatus, the signals are training signals and the parameters are duration of the training signals. The measured durations are compared to known durations of training signals sent by known devices, to determine the identity of the remote communications device.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
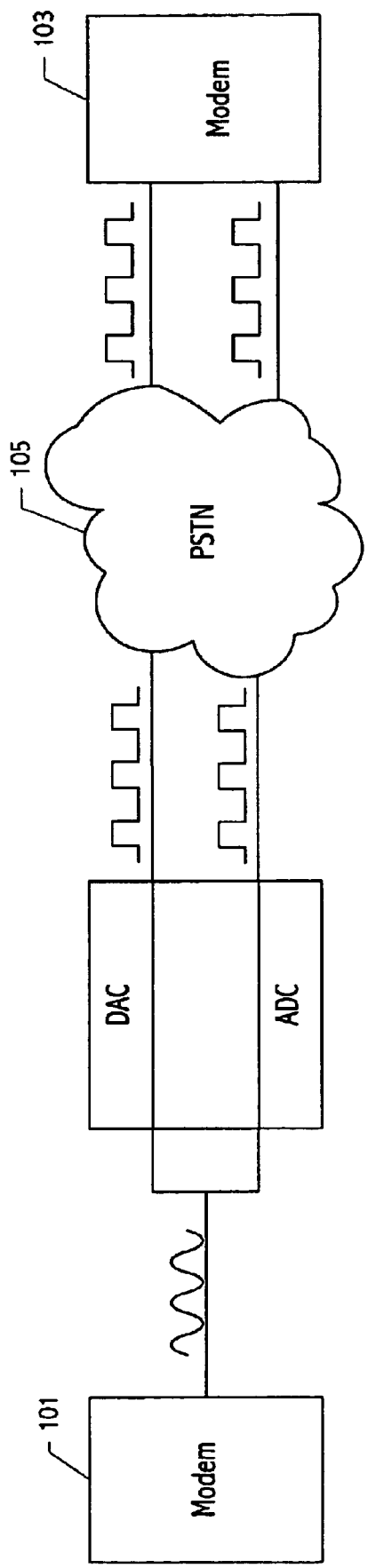
FIG. 1 illustrates a communication system that operates in accordance with the V.90 Recommendation that can advantageously exploit an embodiment of the present invention.

Referring to FIG. 1 an exemplary modem communication system is illustrated in which an embodiment of the invention can be utilized. Modem 101 communicates with modem 103 through a public switched telephone network 105. In the illustrated embodiment, assume that modem 101 is an analog modem operating in accordance with the V.90 Recommendation and that modem 103 is a digital modem also operating in accordance with the V.90 Recommendation. As is known in the art, the quantization noise associated with analog to digital conversion (ADC) required for upstream communication limits upstream communication to 33,600 bits per second. As is also known in the art, the noise associated with digital to analog conversion (DAC) for downstream communication from modem 103 to modem 101 allows communication to take place at a maximum of 56,000 bits per second for devices operating in accordance with V.90.

As previously discussed, as part of the V.90 Recommendation the spectral characteristics of a signal emitted by a digital modem can be altered by "spectral shaping" and that certain digital modems require spectral shaping to always be enabled to function properly. In order for the analog modem to only request spectral shaping either because the line requires it or the particular digital modem requires it, a mechanism, described below, can identify those digital modems that always require spectral shaping. In that way, the analog modem can improve performance with digital modems in general by dropping spectral shaping when the line does not require it but can still support those digital modems that always require spectral shaping.

That mechanism is as follows. Communication standards may specify certain signaling protocols with some ambiguity. For example, communication standards do not always require a precise duration for certain signals, but rather specify a range or minimum duration for the signal. Different modem makers may implement their modems with such signals having different durations and thus a particular modem type or manufacturer may be identifiable from a characteristic, such as duration, associated with those signals. For example ITU-T Recommendation V.90 provides for the duration of training signal $TRN_{1d}$ to be $\geq 2040$ T without specifying an exact time, where T is the symbol rate. Training signals are used by modems to determine line characteristics and train their transceivers accordingly. The training signal $TRN_{1d}$ is sent by the digital modem during phase 3, which is equalizer and echo canceller training. In addition, the duration of $TRN_{2d}$ signal, which is sent by the digital modem during final training, is also only specified to be $\geq 2040$ T. Thus, where manufacturers utilize different durations for at least one of those training signals, a modem can be specifically identified by manufacturer.

The analog modem includes a database, e.g., in the form of a lookup table, of the duration of signals $TRN_{1d}$ and $TRN_{2d}$ for different manufacturers or types of digital modems. In the lookup table, a pair of values specifying the duration of signals $TRN_{1d}$ and $TRN_{2d}$ uniquely identifies, or identifies with a sufficient degree of probability, a particular digital modem by brand, manufacturer and/or model.

Figure 2:
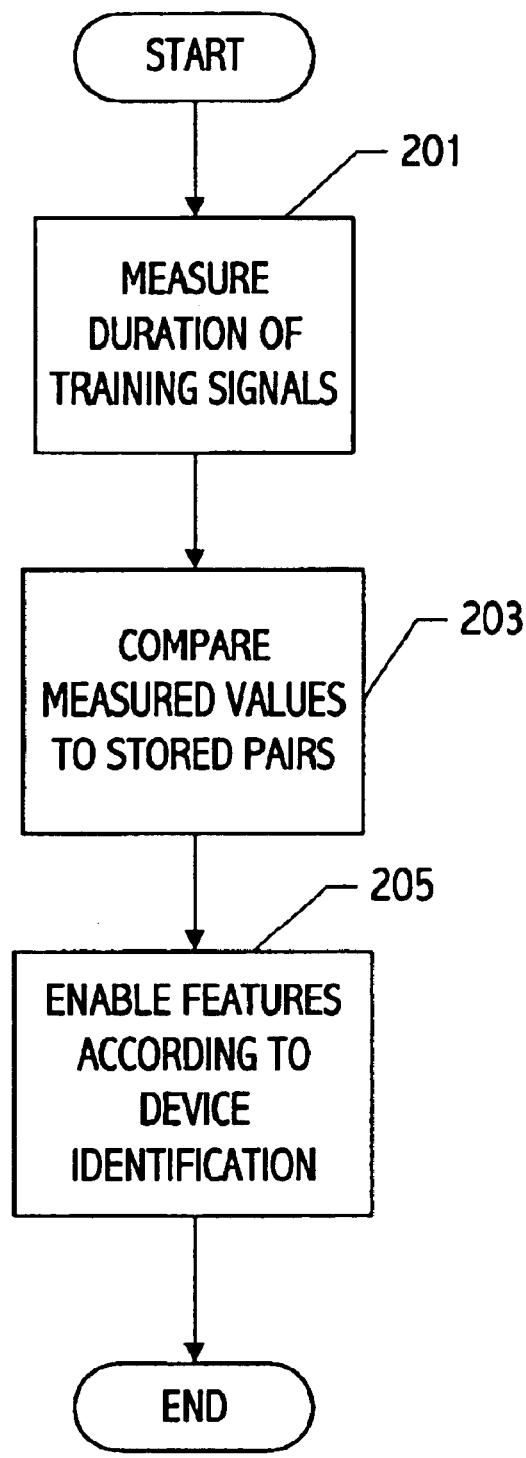
FIG. 2 is a flow chart illustrating system operation in accordance with an embodiment of the present invention. The use of the same reference symbols in different drawings indicates similar or identical items.

Referring to FIG. 2, in order to identify a remote modem, the analog modem goes through the following sequence. In 201, the analog modem measures the duration of training signals $TRN_{1d}$ and $TRN_{2d}$ to obtain a pair of measured values. The pair of measured values is compared in 203 with the known values stored in the lookup table. If the measured duration matches an entry in the lookup table, the modem is identified as the one corresponding to the entry. Then the set of performance enhancing features and/or the set of deficiency compensation features required for a particular type or brand of a digital modem, is enabled in 205. Thus, if a digital modem is identified as one always requiring spectral shaping, the analog modem does not turn spectral shaping off even if the line characteristics do not require it. Of course, if the pair of measured values does not correspond to any in the data base, no action is taken by the analog modem related to the identification.

Note that while a pair of measurements may be used to identify the remote device, duration of a single training signal may be sufficient to identify the remote device. Thus, only one of signals $TRN_{1d}$ and $TRN_{2d}$ may be used to identify the remote device. In addition, the analog modem may be identified by duration of a training signal. For example, the analog modem sends a signal TRN in accordance with V.90, whose duration may vary among manufacturers and be utilized to identify the analog modem.

While the description so far has emphasized modems and more particularly those operating in accordance with the V.90 Recommendation, the approach to identifying remote communication equipment can be extended to other communication devices that operate according to other communication standard(s), in which signals are specified in a manner that allows for unique identification (including e.g., the V.32 and V.34 Recommendations). Thus, whenever a communication standard specifies a signal or signals, used for example in transceiver training or channel analysis, that have variable properties or characteristics, such as a duration, unique identification may be made based on those properties. That presumes that different manufacturers implement communications equipment according to a communications protocol that have properties that can be distinguished from other implementations of the same communication protocol. Once the identification is known, the capabilities known to be associated with the remote device can be exploited.

As another example, the Splitterless Asymmetric Digital Subscriber Line (ADSL) Transceivers Recommendation (ITU Recommendation G.992.2, which is incorporated herein by reference) specifies that the C-ECT and R-ECT signals, which are signals used to train the echo canceller as described in 11.7.7 and 11.8.4, respectively of G.992.2, may be defined differently by different vendors. The duration of the signals is fixed, but the definition of the signal is definable by vendors given certain power constraints defined by the Recommendation.

While duration of a signal, measured in time or symbol rate, is one property or characteristic that can be utilized, other properties, alone or in conjunction with duration can also be utilized as an indicator of manufacturer, model and/or device.

Devices operating in accordance with ANSI T1.413-1998 (Network and Customer Installation Interfaces—Asymmetric Digital Subscriber Line (ADSL) Metallic Interface (which is incorporated herein by reference)) may also utilize the approach described herein to identify a remote communication device to provide performance enhancing or deficiency correcting capability based on comparing characteristics of signals sent by a remote communication device during transceiver training or channel analysis to characteristics of signals sent by known devices.

Note that while certain standards (e.g., the G.992.2 Recommendation) may allow exchange of manufacturer identification information, that information may not be specific enough to identify a particular model of communication equipment. Different models from the same manufacturer may have different performance enhancements or deficiency corrections that can or should be made. Thus, the approach describe herein may be useful even if a communication standard provides a mechanism to provide certain vendor information.

Thus, various characteristics or properties of signals can be used in various communication protocols to identify with sufficient likelihood the model or manufacturer or type of device. Based on that identification, communication capabilities of the remote communication device can be exploited.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method comprising:
   evaluating one or more characteristics associated with one or more signals sent by a remote communication device to a local communication device, the signals being sent according to a communication protocol allowing variability in the one or more characteristics, the one or more characteristics varying for at least some implementations of the communication protocol;
   comparing the evaluated one or more characteristics to characteristics of signals sent by known devices; and
   enabling a communication feature according to the comparing of the evaluated one or more characteristics to thereby better communicate with the remote communication device,
   wherein the remote communication device is a digital modem and the communication feature is a request for spectral shaping by an analog modem.

2. The method as recited in claim 1 further comprising determining an identity of the remote communication device based on the comparing of the evaluated one or more characteristics.

3. The method as recited in claim 2 wherein the identity of the remote communication device is determined according to at least one of brand, type or model.

4. The method as recited in claim 1 wherein the evaluating occurs during a training phase establishing properties of a communication medium coupling the remote communication device to the local communication device.

5. The method as recited in claim 1 wherein the evaluating is performed in a first communication device operating as a modem in accordance with ITU-T Recommendation V.90.

6. The method as recited in claim 1 further comprising enabling one or more performance enhancing or deficiency compensation features according to the comparing of the evaluated one or more characteristics.

7. A computer program product encoded in at least one computer readable medium, comprising:
   a first instruction sequence executable to evaluate one or more characteristics associated with signals sent by a remote communication device, wherein the one or more signals are sent according to a communication protocol allowing variability in the one or more characteristics; and
   a second instruction sequence executable to compare the evaluated one or more characteristics to stored characteristics of known communication devices and to provide a comparison result,
   wherein duration of one or more training signals are the one or more characteristics and wherein the second instruction sequence compares a measured duration to stored duration values to identify the remote communication device.

8. The computer program product as recited in claim 7 wherein the comparison result is used to determine an identity of the remote communication device.

9. The computer program product as recited in claim 8 further comprising an instruction sequence executable to enable at least one of a performance enhancing or deficiency compensation feature according to the identification of the remote communication device.

10. The computer program product as recited in claim 7, wherein the at least one computer readable medium is selected from the set of a disk, tape or other magnetic, optical, or electronic storage medium and a network, wireline, wireless or other communication medium.

11. The computer program product as recited in claim 7 wherein the computer program product is executable on a device having communication capability and which is coupled to the remote communication device.

12. A computer program product encoded in at least one computer readable medium, comprising:
   a first instruction sequence executable to evaluate one or more characteristics associated with signals sent by a remote communication device, wherein the one or more signals are sent according to a communication protocol allowing variability in the one or more characteristics;
   a second instruction sequence executable to compare the evaluated one or more characteristics to stored characteristics of known communication devices and to provide a comparison result; and
   a third instruction sequence executable to enable a communication feature according to the comparison result to thereby better communicate with the remote communication device,
   wherein the remote communication device is a digital modem and the feature is a request for spectral shaping by an analog modem.

13. A method comprising:
  evaluating one or more characteristics associated with one or more signals sent by a remote communication device to a local communication device, the signals being sent according to a communication protocol allowing variability in the one or more characteristics, as amongst implementations of the communication protocol; and
  comparing the evaluated one or more characteristics to characteristics of signals sent by known devices, wherein the local communication device performs the evaluating by measuring a duration of one or more training signals, duration of the one or more training signals corresponding to one or more characteristics of the one or more signals sent by the remote communication device.

14. The method as recited in claim 13 wherein an identity of the remote communication device is determined according to at least one of brand, type or model.

15. The method as recited in claim 13 further comprising enabling a communication feature according to the comparing of the evaluated one or more characteristics to thereby better communicate with the remote communication device.

16. The method as recited in claim 15 wherein the remote communication device includes a digital modem and the communication feature is a request for spectral shaping by an analog modem.

17. The method as recited in claim 13 wherein the remote communication device includes one of a digital modem and an analog modem.

18. The method as recited in claim 13 wherein the evaluating is performed in a first communication device operating as a modem in accordance with ITU-T Recommendation V.90.

19. The method as recited in claim 13 further comprising enabling one or more performance enhancing or deficiency compensation features according to the comparing of the evaluated one or more characteristics.

20. The method as recited in claim 13 wherein the training signals are modem training signals $TRN_{1d}$ and $TRN_{2d}$ and the duration of the modem training signals are measured and wherein during the comparing, the measured duration is compared to stored duration values to identify the remote communication device.

21. The method as recited in claim 13 wherein the duration is measured in terms of a number of symbols transmitted.

22. A computer program product encoded in at least one computer readable medium, comprising:
  a first instruction sequence executable to evaluate one or more characteristics associated with signals sent by a remote communication device; and
  a second instruction sequence executable to compare the evaluated one or more characteristics to stored characteristics of known communication devices and to provide a comparison result, wherein duration of one or more training signals correspond to the one or more characteristics and wherein the second instruction sequence compares a measured duration to stored duration values to identify a remote communication device.

23. The computer program product as recited in claim 22, wherein the at least one computer readable medium is selected from the set of a disk, tape or other magnetic, optical, or electronic storage medium and a network, wireline, wireless or other communications medium.

24. The computer program product as recited in claim 22 further comprising an instruction sequence executable to enable a communication feature according to the comparison result to thereby better communicate with the remote communication device.

25. The computer program product as recited in claim 24 wherein the remote communication device is a digital modem and the feature is a request for spectral shaping by an analog modem.

26. The computer program product as recited in claim 22 wherein the computer program product is executable on a device having communication capability and which is coupled to the remote communication device.

27. The computer program product as recited in claim 22 further comprising an instruction sequence executable to enable at least one of a performance enhancing or deficiency compensation feature according to the identification of the remote communication device.

28. An apparatus comprising:
  a first device operable to measure one or more parameters associated with one or more signals sent during a communication session with a remote communications device, wherein the one or more signals include training signals and wherein the one or more parameters include duration of the training signals; and
  storage elements containing known one or more parameters associated with one or more known communication devices, wherein the first device is operable to compare the measured one or more parameters of the one or more signals to the stored one or more parameters of known devices.

29. The apparatus as recited in claim 28 further comprising enabling one or more performance enhancing or deficiency compensation features according to the comparison of the measured one or more parameters.

30. The apparatus as recited in claim 28 wherein comparing the measured one or more parameters is used to determine an identity of the remote communications device.

31. The apparatus as recited in claim 28 wherein the one or more parameters include the number of symbols sent.

32. The apparatus as recited in claim 28 wherein the first device is a modem.

33. The apparatus as recited in claim 28 wherein the training signals are modem training signals $TRN_{1d}$ and $TRN_{2d}$, the duration of the modem training signals being measured and compared to known durations to determine an identity of the remote communications device.

* * * * *

UNITED STATES PATENT AND TRADEMARK OFFICE
CERTIFICATE OF CORRECTION

PATENT NO. : 6,914,933 B1
DATED : July 5, 2005
INVENTOR(S) : Gonikberg

It is certified that error appears in the above-identified patent and that said Letters Patent is hereby corrected as shown below:

<u>Column 6,</u>
Line 44, delete "communication", insert -- communications --.

<u>Column 7,</u>
Line 40, delete "are", insert -- is --.

Signed and Sealed this

Twenty-fifth Day of April, 2006

JON W. DUDAS
*Director of the United States Patent and Trademark Office*